March 28, 1961  D. BENJAMIN  2,977,427
REEL FOR LAWNMOWER CORD

Filed Oct. 3, 1957  2 Sheets-Sheet 1

INVENTOR.
DAVID BENJAMIN
BY Oldham & Oldham
ATTYS.

March 28, 1961     D. BENJAMIN     2,977,427
REEL FOR LAWNMOWER CORD
Filed Oct. 3, 1957     2 Sheets-Sheet 2
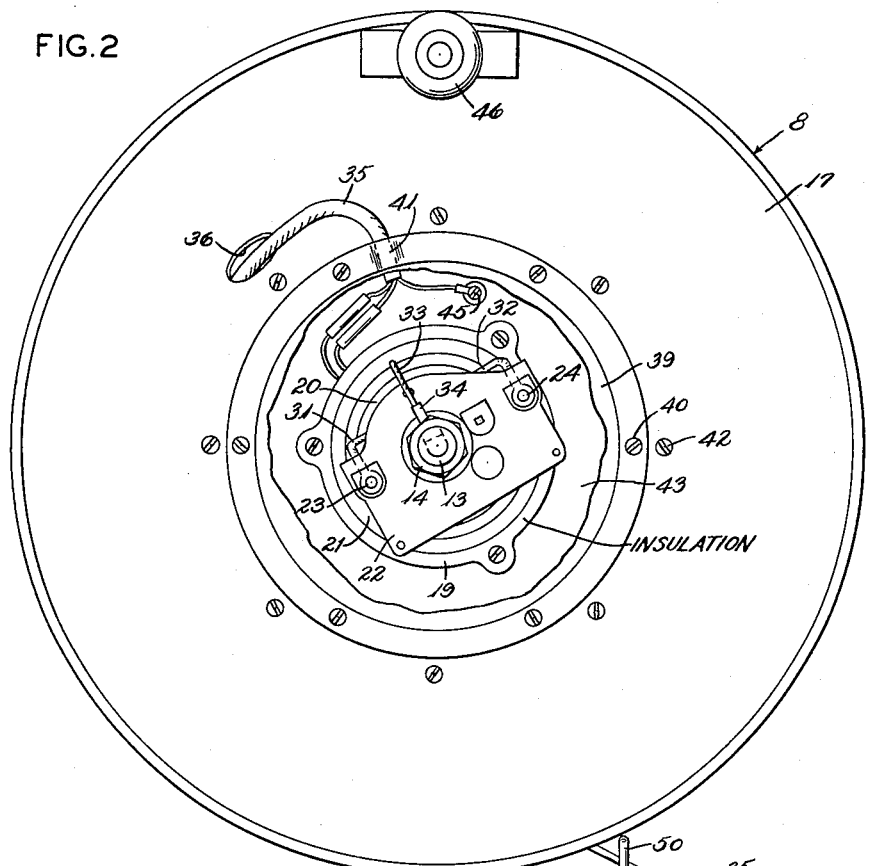
FIG. 2
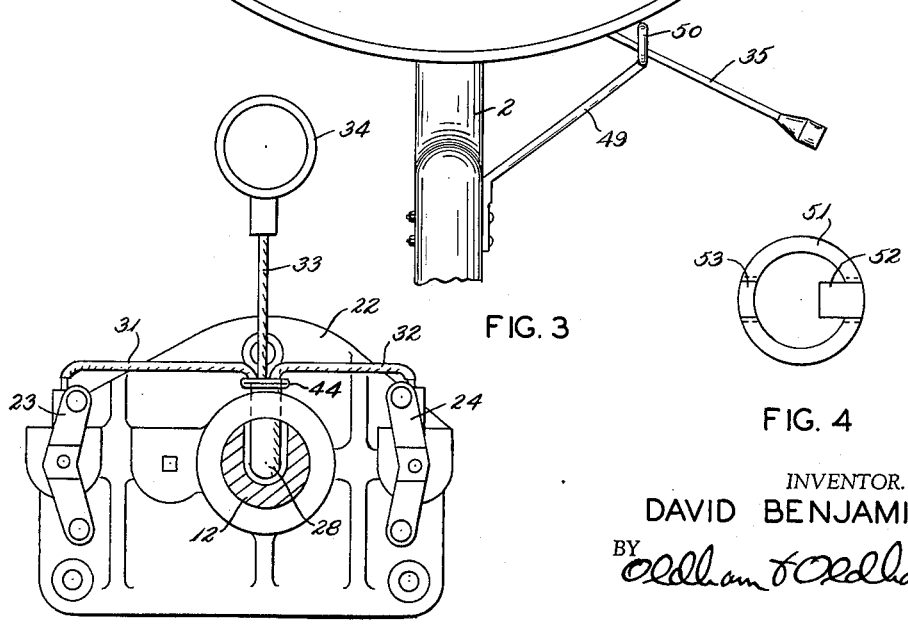
FIG. 3
FIG. 4
INVENTOR.
DAVID BENJAMIN
BY Oldham & Oldham
ATTYS.

United States Patent Office 2,977,427
Patented Mar. 28, 1961

2,977,427

REEL FOR LAWNMOWER CORD

David Benjamin, Cleveland, Ohio, assignor to Benjamin Reel Products, Inc., Cuyahoga County, Ohio, a corporation of Ohio Filed Oct. 3, 1957, Ser. No. 687,973

1 Claim. (Cl. 191—12.2)

This invention relates to reels for electric extension cords and is especially useful where a long flexible cord containing energized conductors is to be reeled while attached to a portable apparatus such as a lawn mower, floor sander or the like.

It is an object of the invention to provide a reel rotatable while connected to a power source and to a portable motor or other power consuming apparatus.

Another object is to provide for simultaneous rotation of the reel about horizontal and vertical axes, or to lock it against rotation except about one axis.

A further object is to provide a frictional drag on the reel by means of a conical telescopic spring.

Another object is to provide a support having a tubular portion for receiving a feed cable and a solid terminal portion for supporting a commutator.

Other objects are to provide a safe, efficient and neat and waterproof reel apparatus.

These and other objects will appear from the following description, reference being had to the accompanying drawings forming a part hereof.

Of the drawings,

Fig. 2 is an end elevation of the reel, parts being broken away to show the collector rings.

Fig. 3 is a detail view of the brush block and its connections.

Fig. 4 is a detail view of the brush block locking disc.

Figure 1:
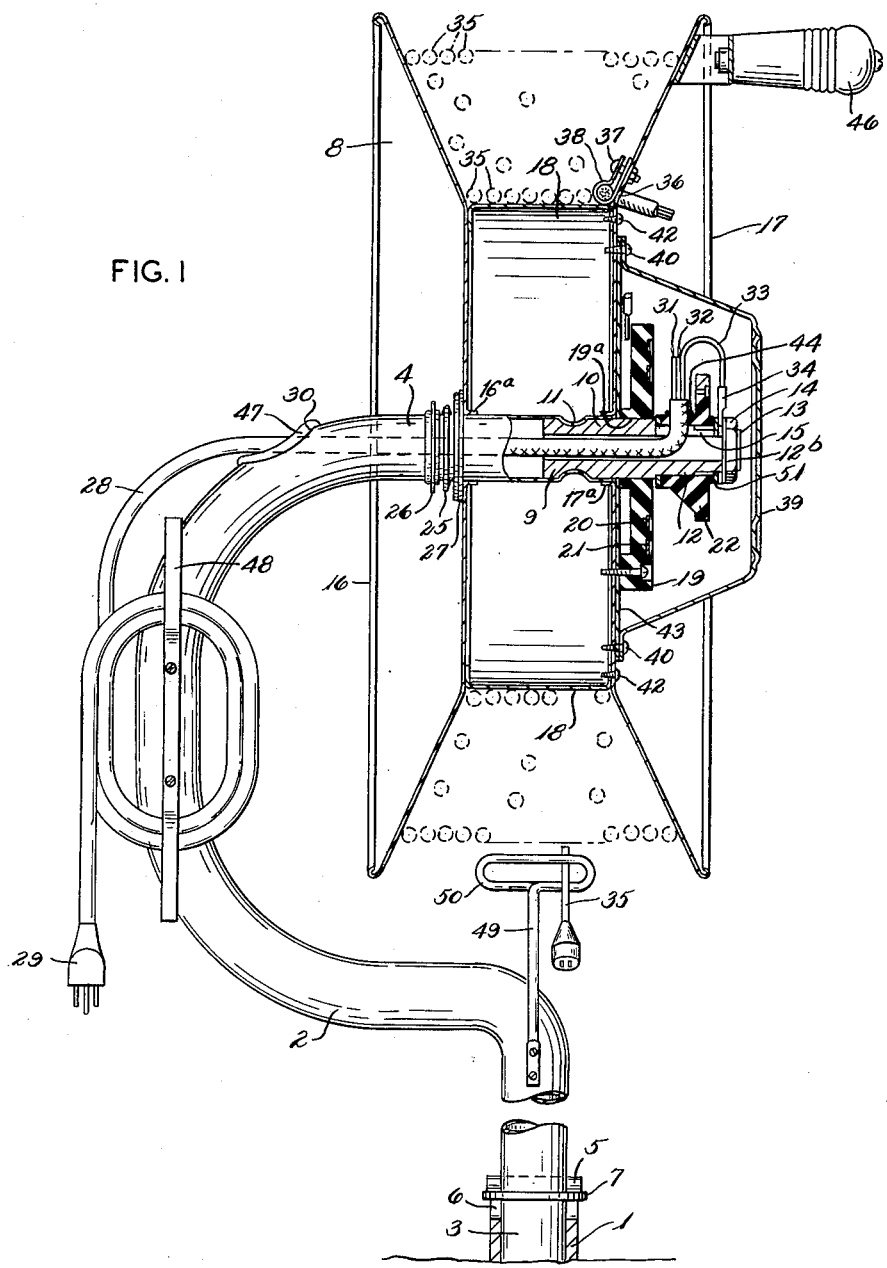
Fig. 1 is an axial sectional view of a reel and its support, the support being shown partially in elevation.

Referring to the drawings, the numeral 1 designates a retaining and locating socket member which is of tubular form and may be fixed in the earth or secured to any non-movable surface. A tubular gooseneck support 2 has a socket-engaging portion 3 and an axle-engaging portion 4 perpendicular thereto. The socket-engaging portion has a roll pin 5 extending crosswise and a cross-slot 6 is formed in the end of the socket. The arrangement is such that the gooseneck support may be seated in the socket with the roll pin engaging the slot to prevent rotation of the gooseneck support relative to the socket. A washer 7 may be placed over the socket before inserting the gooseneck support and with such arrangement as illustrated in Fig. 1, the support may then be rotated about the axis of the socket.

A reel 8 is mounted for rotation about the axle-engaging portion of the support and about an axle 9 supported thereby. The axle 9 is machined from bar stock, or is a die casting and has an end portion 10 equal in size to the bore of the tubular support. A groove or dimples 11 are provided in the axle 9 into which the tubular material of the support is formed as by swaging, a reduced diameter portion 12 for receiving a brush holder block, and a further reduced threaded portion 13 therebeyond for engaging a retaining nut 14. The outer reduced end 12 of the axle is cut away or formed to provide a side outlet notch 15 for passage of the feed cable.

The reel 8 comprises a pair of conically flared side discs 16, 17 with a drum-like cylindrical barrel 18 secured therebetween. Each disc 16, 17 is formed with bearings 16a and 17a to rotatably engage the support and axle and a flat center portion for closing open ends of the drum to which they are secured by screws. A collector ring disc 19 of insulating material is mounted on the head of disc 17 at the outboard side and has a bearing 19a for rotatably engaging the axle. It has collector rings 20, 21 for connection with the supply cord. A brush holder block 22 of insulating material is mounted on the reduced portion 12 of the axle and is held thereon against rotation by a locking disc 51, a lock washer 12b and a nut 14. It carries brushes 23, 24 which press against collector rings 20, 21. The locking disc 51 has a tongue 52 projecting radially inward of the notch 15 to prevent relative rotation and has an axially extending lug 53 which engages openings in the brush holder block 22 for the same purpose.

At the opposite face of the reel a conical telescopic spring 25 is compressed between a collar 26 fixed to the axle-supporting portion of the support and a loose collar 27 thereabout. Collar 27 rests against the adjacent reel surface and acts as a drag or friction brake to prevent undesired rotation of the reel and also to tension the collector brushes.

A feed cable 28 extends from an attachment plug 29 through a side opening 30 in the support and through the bore and side outlet of the axle. This cable preferably has three conductors, two of which 31 and 32 are connected to brushes 23 and 24, respectively. The other wire 33 is grounded on axle 9 as by a connector 34 engaged under nut 14. A strain relief clamp 44 about the cable beyond the notch 15 relieves strain on the conductors.

The supply cord 35 has its inner end extending through an opening 36 in disc 17 of the reel and is clamped against the disc 17 by a bolt 37 and a strain relief clamp 38. A seamless pan-like cover 39 is clamped over the disc 17 by screws 40 to provide a water-tight compartment. A notch 41 is formed in one margin of the cover 39 for entrance of the end of the supply cord, and the cover 39 is clamped over and about the cord received within the notch 41. A gasket 43 is provided to seal the joint between the cover 39 and the disc 17. This gasket is preferably an insulating disc which covers the central portion of the disc 17 under the collector ring disc 19.

The reel 8 shows screws 42 securing the disc 17 to an assembly made by spot welding the disc 16 to the barrel 18.

The ends of the supply cord, usually three, are secured one to each of the two collector rings 20, 21, and the third is grounded on the disc 17 of the reel by a ground connection 45. Thus the connections are all made within a waterproof compartment between the disc 17 and the cover 39 so that grounding of the conductors through the reel is substantially prevented and all contacts are readily accessible.

For rotating the reel 8, an insulating handle 46 is secured to the disc 17 near its periphery and extends axially thereof. A grommet 47 is positioned around the opening 30 in the support 2.

A cleat 48 is secured to the gooseneck support 2 so that the supply cable may be draped thereabout when not in use. To aid in controlling the paying out and retracting of the cord 35, a guide 49 is secured to the support 2 and has an open centered end 50 through which the cord is threaded.

Thus it will be seen that the objects of the invention have been attained.

While certain details of construction have been shown and described to illustrate the invention, it will be understood by those skilled in the art that variations and modifications can be made without departing from the scope of the invention as defined by the following claim:

I claim:

An attachment cord reeling apparatus comprising a socket member having a cylindrical socket for pivotally retaining a reel in an anchoring location, a tubular gooseneck support having one cylindrical socket engaging end portion for pivotally engaging said socket and an axle engaging end portion spaced therefrom and angularly disposed to the axis of the socket engaging end, a reel axle non-rotatably secured to said axle engaging portion of the support in continuation thereof and angularly disposed to said socket engaging end, a reel having axial bearings for rotatably engaging said axle and the support adjacent thereto for rotation about the axis of said axle, a collector ring supporting disc of insulating material coaxial with and secured to a side of the reel for rotation therewith, a brush holding block of insulating material non-rotatably secured to said axle adjacent said disc, said block carrying brushes insulated one from another and engaging spaced apart collector rings carried by said disc, a feed cable extending through the bore of said gooseneck support axially through said reel, said feed cable having a plurality of insulated conductors each secured conductively to a brush on said brush holder and one conductor grounded on said axle, a supply cord adapted to be wound about said reel, the innermost end of said cord being clamped to said reel and having insulated conductors extending through a wall of the reel, said cord having a plurality of insulated conductors each conductively secured to a collector ring of said disc and one conductor grounded on said reel, said gooseneck support and said socket member having interlocking key and notch means thereon for locking them against relative rotation, and a removable collar selectively positionable between said key and notch means for permitting swivel movement or locked engagement selectively.

References Cited in the file of this patent

UNITED STATES PATENTS

| | | |
|---|---|---|
| 279,713 | Connolly et al. | June 19, 1883 |
| 1,227,105 | Barnes | May 22, 1917 |
| 1,379,337 | George et al. | May 24, 1921 |
| 1,420,350 | Thiele | June 20, 1922 |
| 2,074,305 | Tornblom | Mar. 16, 1937 |
| 2,142,654 | Posner | Jan. 3, 1939 |
| 2,480,401 | Edwards | Aug. 30, 1949 |
| 2,529,292 | Greenfield | Nov. 7, 1950 |
| 2,554,598 | Storch | May 29, 1951 |
| 2,654,828 | Vandenberg | Oct. 6, 1953 |
| 2,685,353 | Caskie | Aug. 3, 1954 |
| 2,806,993 | Matousek | Sept. 17, 1957 |

FOREIGN PATENTS

| | | |
|---|---|---|
| 463,013 | Italy | Apr. 12, 1951 |